April 15, 1952  J. M. MILLER  2,592,939
SAUSAGE LINKER
Filed July 24, 1947
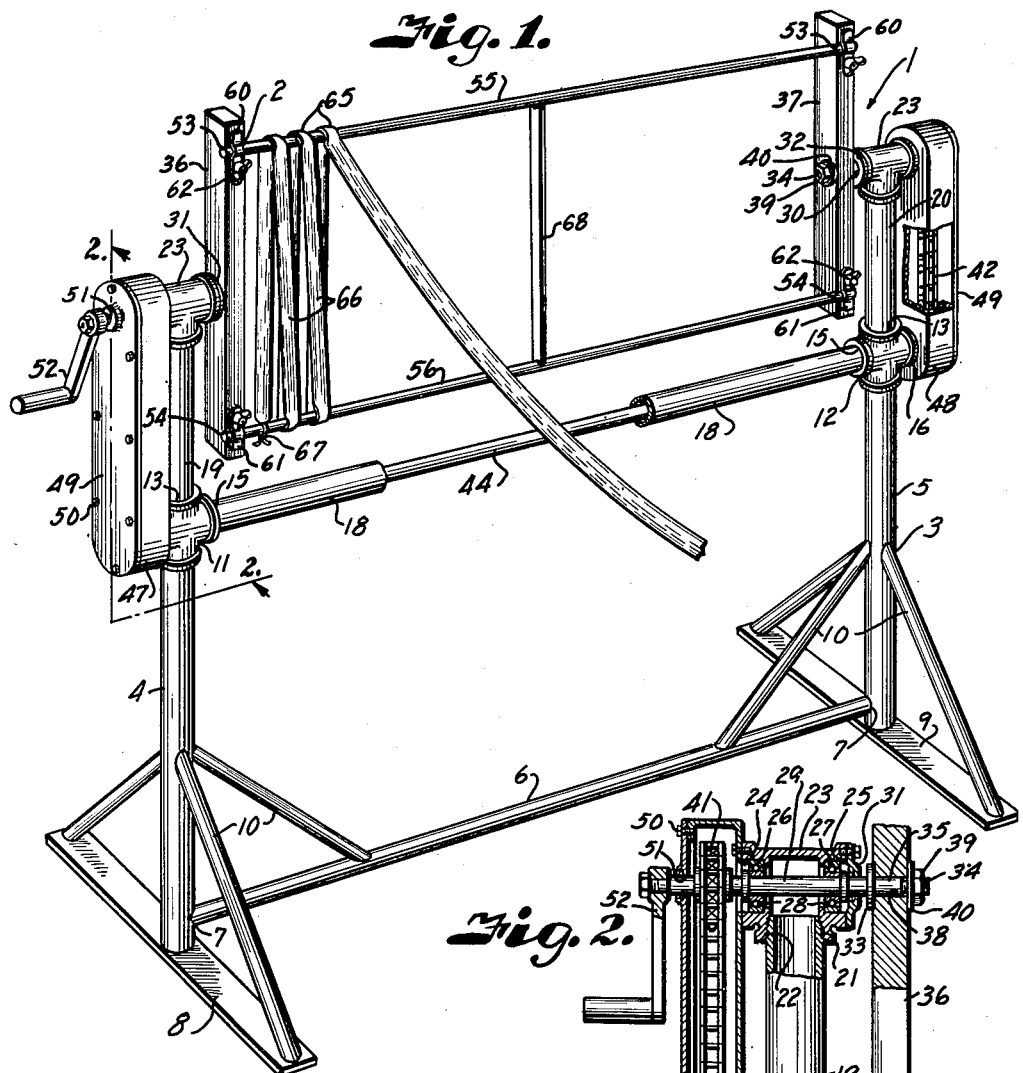
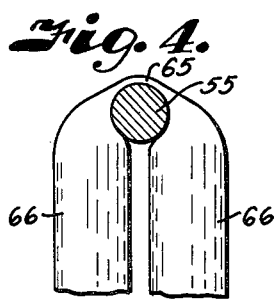
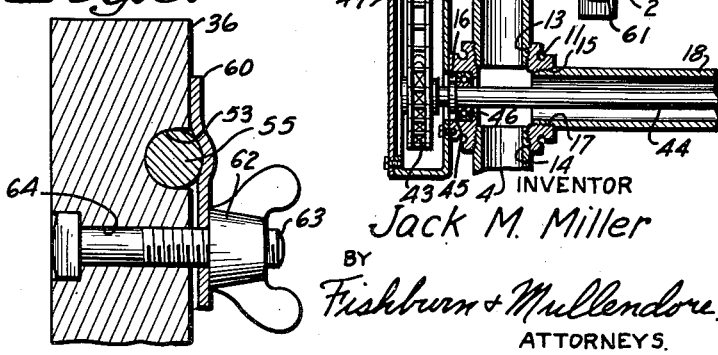
INVENTOR
Jack M. Miller
BY
Fishburn & Mullendore
ATTORNEYS.

Patented Apr. 15, 1952

2,592,939

UNITED STATES PATENT OFFICE 2,592,939

SAUSAGE LINKER

Jack M. Miller, Kansas City, Mo.

Application July 24, 1947, Serial No. 763,276

2 Claims. (Cl. 17—34)

1

This invention relates to apparatus for the manufacture of sausage and more particularly to a machine for forming links in a stuffed sausage casing, the sausage carrying devices of the machine being adapted for supporting the sausage links during the cooking of the meat therein.

It is customary in the manufacture of Vienna and other sausages to form same into links before cooking. There have been various means for twisting and squeezing the casing for said sausage in the making of links, however, due to the inefficiencies in handling and using the various twisting and squeezing devices, the majority of the sausage making industry perform the sausage linking operation by hand, the operator measuring a link of the stuffed casing and twisting same by hand. This method is relatively slow and there is considerable variation in the length of each link and after the linking operation said links must be suitably supported for movement in an oven during the cooking process. Many of the sausages after cooking are cut into a plurality of uniform pieces adapted to fit in a can, said can being sealed and vended to the retail grocery. The variation in the length of each link causes a variation in the length of the ends cut from each link and as it is desirable to use only the inner sections of the link for the canned sausages, the ends are wasted or sold in bulk at greatly reduced prices.

The objects of the present invention are, therefore, to provide a machine for linking sausage whereby the length of each link is accurate and equal, reducing to a minimum the waste in the end pieces cut from the links in the canning of sausage; to provide a sausage linking machine having spaced rotatable arms connected by removable sausage engaging and supporting arms; to provide a sausage linking machine having removable parallel sausage engaging members rotatable for winding a stuffed sausage casing thereon for linking same, said members serving as supports for the sausage during the cooking of the meat therein; to provide a sausage linking machine which is easily cleaned and maintained in a sanitary condition; and to provide a sausage linking machine which is simple, sturdy and efficient for forming accurate lengths in sausage.

In accomplishing these and other objects of the present invention, I have provided improved details of structure, the preferred forms of which are illustrated in the accompanying drawings, wherein:

2

Fig. 1 is a perspective view of a sausage linking machine embodying the features of the present invention.

Fig. 2 is a vertical sectional view through a portion of the machine on the line 2—2 of Fig. 1.

Fig. 3 is an enlarged sectional view through a rotating arm illustrating the means for securing the sausage engaging rods thereon.

Fig. 4 is a detail transverse sectional view through the sausage engaging rods illustrating the flattening of the sausage casing to form the links therein.

Referring more in detail to the drawings:

1 designates a sausage linking machine consisting generally of a reel 2 rotatably mounted on a frame 3. The frame 3 illustrated consists of vertical columns 4 and 5 preferably of tubular metal and arranged in spaced parallel relation. The columns are connected together by a tie member 6 extending therebetween and secured to said columns adjacent their lower ends by welding or the like, as at 7, foot plates 8 and 9 being provided on the lower ends of said columns to provide suitable bearing area on a floor or the like for the machine to aid in holding the columns in upright position. Suitable bracing members 10 are arranged in angular relation to the columns with the ends of said bracing secured to the columns, foot plates and tie member respectively.

Mounted on the upper ends of the columns 4 and 5 are pipe fittings 11 and 12 in the form of a cross having upper and lower threaded apertures 13 and 14 coaxial with the columns 4 and 5. Each of the crosses 11 and 12 is also provided with horizontally arranged flanged apertures 15 and 16, said apertures of the respective crosses being coaxial and the adjacent apertures 15 having threads 17 therein for threadedly engaging a tubular member 18 forming a rigid support for the upper ends of the columns 4 and 5. Threaded into the apertures 13 of the crosses 11 and 12 are column extensions 19 and 20, extending upwardly from the crosses and terminating in threaded ends 21 adapted to engage in threaded openings 22 of T fittings 23, said openings 22 being the intermediate outlets of said T fittings.

The T fittings 23 have horizontally disposed outlets 24 and 25, the axis of said outlets being parallel with the tubular member 18, said outlets on the T's or on the respective column extensions being coaxial. The outlets 24 and 25 of the respective T fittings are preferably bored as at 26 and 27 to receive suitable bearings 28 for mounting shafts 29 and 30, the adjacent ends of the shafts 29 and 30 projecting through closure members 31 and 32 suitably secured to the flange of the outlet 25 of the respective T fittings, the shafts 29 and 30 extending inwardly relative to the column extensions 19 and 20 and having a collar 33 spaced from the threaded ends 34 of said shafts to provide a shank portion 35 for receiving arms 36 and 37 thereon, the shafts 29 and 30 extending through bores 38 in said arms and having a nut and washer 39 and 40 mounted on the threaded ends 34 for rigidly securing the arms 36 and 37 on the respective shafts. The arms 36 and 37 are arranged in parallel relation and are adapted for simultaneous rotation at the same speed to maintain the parallel relationship thereof. In order to rotate the arms 36 and 37 the outer ends of the shafts 29 and 30 extend outwardly relative to the outlets 24 and mounted on said shafts are sprockets 41, the sprocket 41 preferably being operatively connected by means of a chain 42 with a sprocket 43 mounted on each end of a shaft 44 extending through the crosses 11 and 12 and the tubular member 18, the outlet 16 of the crosses 11 and 12 preferably being provided with a suitable bore 45 to receive bearings 46 for suitably mounting the shaft 44.

Each of the chains 42 and the sprockets therefor is enclosed in a housing 47 and 48 suitably mounted on the flanges of the outlets 16 and 24, the outer side of said housings being enclosed by a cover plate 49 secured to the housing by means of screws or other suitable fastening devices 50. The shaft 29 extends through a suitable aperture 51 in the cover plate 49 whereby a crank 52 may be rigidly secured to the outer end of said shaft 29 for rotating the respective shafts 29 and 30. The arms 36 and 37 extend an equal distance on both sides of the axis of the shafts 29 and 30 and adjacent the outer ends of said arms and on one edge thereof are grooves 53 and 54 for mounting rods 55 and 56, said rods being held in the grooves by means of clamps 60 and 61 engaging over the rods 55 and 56 and preferably held in clamping relation by means of a thumb nut 62 threadedly mounted on a screw 63 extending through an aperture 64 in the arms 36 and 37. The rods 55 and 56 serve as supporting rods for sausage which is wound on the rods under tension by rotation of the arms 36 and 37, the tension applied to the sausage casing flattening said casing as at 65 where the casing passes over the respective rods. The casing, being flattened, forms a connection between the respective links 66 formed in said sausage casing.

In constructing a linking machine such as described the shafts 29, 30 and 44 are mounted in their respective bearings and the sprockets 41 and 43 applied to the ends thereof in the housings 47 and 48. Chains 42 are then placed on the sprockets 41 and 43 in such a manner that the arms 36 and 37 are parallel and rotation of the shaft 29 will effect rotation of the sprocket 41 operating the chain 42 to rotate the sprocket 43 and shaft 44 for rotating the shaft 30 simultaneously to the shaft 29 to maintain the parallel relationship of the arms 36 and 37. When the alignment is secured the cover plates 49 are applied to the housings 47 and 48 and the crank 52 rigidly secured to the projecting end of the shaft 29. The thumb nuts 62 are then loosened whereby the clamp plates 60 and 61 may be pivoted on the screw 63 permitting the rods 55 and 56 to be inserted in the grooves 53 and 54 in the respective arms 36 and 37.

The linking machine is preferably arranged near a sausage casing stuffing machine and as the casings are stuffed one end is tied to a rod as at 67 and tension applied to the sausage casing. An operator then turns the crank 52 to rotate the shafts 29 and 30 and arms 36 and 37 to wind the casing on the rods 55 and 56, the tension applied to the sausage casing flattening said casing where it passes over the respective rods as at 65, squeezing the meat from that portion of the casing to form the links 66. The sausage casing is preferably held at an angle to the axis of rotation of the arms 36 and 37 whereby each link 66 will be spaced slightly from its adjacent link as shown in Fig. 1. After a portion of the rods is filled with links, the machine is stopped and a spacing bar 68 placed between the rods 55 and 56 preferably centrally located relative to the length thereof to prevent the tension applied to the links from bending the rods toward each other. The crank 52 is then further rotated to completely fill the reel with sausage. After the reel is filled the thumb nuts 62 are loosened to release the clamp plates 60 and 61 from the rods 55 and 56 whereby the rods may be lifted or otherwise removed from the arms 36 and 37. The sausage is then hung on suitable racks by supporting the ends of the upper rods thereon and after a quantity of sausage has been placed on the rack, said racks are moved to an oven for cooking the sausage.

The cooking process seals the portions of the casing together to separate the links as at 65 and after being cooked the portion 65 is cut to divide said links. Each of the links is then of substantially the same length and may be placed in a suitable cutting machine for cutting into equal length sections for packing in suitable tins or the like with substantially no waste by variation of the ends of said links.

It is believed obvious that I have provided a sausage linking machine capable of efficiently forming links of equal length and facilitating the handling of said link sausage during the other processing steps prior to canning same.

What I claim and desire to secure by Letters Patent is:

1. In a machine for linking sausage, a pair of spaced supports, aligned bearings in the respective supports, a pair of coaxial shafts rotatably mounted and retained in said aligned bearings, said shafts each extending from its repective support toward the other support and terminating in longitudinally spaced relation to the other shaft, parallel arms on adjacent ends of the respective shafts and in spaced relation to the respective supports, said arms extending in diametrically opposed directions from the shafts with unobstructed completely open space between the arms, a pair of rods in spaced parallel relation to the axis of the shafts and spanning the space between the arms on the respective shafts with the end portions of said rods removably mounted on one side of said arms, said rods being on opposite sides of the axis of the shafts, means having driving connection with the respective shafts for simultaneously rotating same to maintain the relative position of the arms and revolve the pair of rods in an orbit about the axis of rotation of said shafts for winding sausage on the rods under tension which flattens the sausage casing on said rods to form links in said sausage, and means for releasing the rods from the arms for bodily removal of the rods with the sausage links thereon laterally from the arms with the weight of one rod applying tension to the sausage supported on the other rod to retain the flattened portions of the sausage casing in flattened condition.

2. In a machine for linking sausage having a reel on spaced coaxial shafts rotatably carried in spaced supports with means for simultaneously rotating the shafts, said reel including parallel arms at the ends thereof fixed on adjacent ends of the coaxial shafts with unobstructed completely open space between said arms, said arms extending in diametrically opposed directions from the axis of the shafts, a pair of rods in spaced parallel relation to the axis of the shafts and spanning the space between the arms on the respective shafts, said rods being on opposite sides of the axis of the shafts, and means releasably mounting the ends of the rods on one side of the respective arms whereby rotation of the shafts revolve the arms and rods thereon in an orbit about the axis of rotation of the shafts for winding sausage on the rods under tension which flattens the sausage casing on said rods to form links in said sausage on each side of the axis of the shafts, the rods being on one side of the arms and the space between the arms being otherwise unobstructed whereby release of the rods permits bodily removal thereof with the sausage links thereon laterally from the arms.

JACK M. MILLER.

REFERENCES CITED

The following references are of record in the file of this patent:

UNITED STATES PATENTS

| Number | Name | Date |
|---|---|---|
| 552,416 | Castle | Dec. 31, 1895 |
| 622,695 | Kurth | Apr. 11, 1899 |
| 683,594 | Dobson | Oct. 1, 1901 |
| 1,411,098 | Horton | Mar. 28, 1922 |
| 1,629,655 | Curry | May 24, 1927 |
| 1,936,354 | Edwards | Nov. 21, 1933 |
| 2,087,673 | Lisberg | July 20, 1937 |